United States Patent
Li et al.

(10) Patent No.: US 9,970,630 B2
(45) Date of Patent: May 15, 2018

(54) QUANTUM DOT LIGHT-EMITTING DEVICE AND DISPLAY DEVICE

(71) Applicants: HISENSE ELECTRIC CO., LTD., Shandong (CN); Hisense USA Corp., Suwanee, GA (US); HISENSE INTERNATIONAL CO., LTD., Shandong (CN)

(72) Inventors: Fulin Li, Shandong (CN); Jianwei Cao, Shandong (CN); Shunming Huang, Shandong (CN); Dengyin Zhang, Shandong (CN)

(73) Assignees: HISENSE ELECTRIC CO., LTD., Qingdao (CN); HISENSE USA CORP., Suwansee, GA (US); HISENSE INTERNATIONAL CO., LTD., Qingdao (CN)

( * ) Notice: Subject to any disclaimer, the term of this patent is extended or adjusted under 35 U.S.C. 154(b) by 55 days.

(21) Appl. No.: 15/214,891

(22) Filed: Jul. 20, 2016

(65) Prior Publication Data

US 2017/0067604 A1 Mar. 9, 2017

(30) Foreign Application Priority Data

Sep. 8, 2015 (CN) .......................... 2015 1 0565875

(51) Int. Cl.
*F21V 9/30* (2018.01)
*F21V 7/22* (2018.01)
*F21V 9/16* (2006.01)
*G02F 1/1335* (2006.01)
*F21V 8/00* (2006.01)

(52) U.S. Cl.
CPC .................. *F21V 9/30* (2018.02); *F21V 7/22* (2013.01); *F21V 9/16* (2013.01); *G02F 1/1336* (2013.01); *G02B 6/0073* (2013.01); *G02F 1/133602* (2013.01); *G02F 1/133615* (2013.01); *G02F 2001/133614* (2013.01); *G02F 2202/108* (2013.01)

(58) Field of Classification Search
CPC .............................. F21V 9/16; F21Y 2115/10
USPC ........................................................ 362/606
See application file for complete search history.

(56) References Cited

U.S. PATENT DOCUMENTS

| | | | | |
|---|---|---|---|---|
| 2012/0140436 A1* | 6/2012 | Yang | .......................... | F21V 9/16 362/84 |
| 2014/0354145 A1* | 12/2014 | Fisher | ....................... | F21K 9/54 313/512 |
| 2015/0098206 A1* | 4/2015 | Pickard | ..................... | F21K 9/23 362/84 |
| 2015/0323728 A1* | 11/2015 | Lee | ....................... | G02B 6/0043 362/97.1 |

* cited by examiner

Primary Examiner — Toan Ly
(74) Attorney, Agent, or Firm — McDermott Will & Emery LLP (57) ABSTRACT

A quantum dot light-emitting device: a pedestal; a light-emitting chip arranged on the pedestal; and a quantum dot layer arranged on the pedestal, the quantum dot layer being located in a light emergent side of the light-emitting chip with a gap being arranged between the quantum dot layer and the light-emitting chip, wherein reflection points are arranged on a surface of the quantum dot layer opposite to the light-emitting chip, and the reflection points are at least distributed in a region of the quantum dot layer directly facing the light-emitting chip.

11 Claims, 7 Drawing Sheets

QUANTUM DOT LIGHT-EMITTING DEVICE AND DISPLAY DEVICE

CROSS REFERENCE OF RELEVANT APPLICATIONS

The application claims the priority of the Chinese Patent Application No. 201510565875.0 submitted on Sep. 8, 2015 to the Chinese Patent Office, titled "QUANTUM DOT LIGHT-EMITTING DEVICE, BACK-LIGHT MODULE AND DISPLAY DEVICE", which is incorporated herein by reference in its entirety.

FIELD OF TECHNOLOGY

The present disclosure relates to the technical field of display, and in particular to a quantum dot light-emitting device and a display device.

BACKGROUND

Color gamut is an index for describing the color fidelity that a display can achieve. At present, the back-light solution, employed in the industry to excite the quantum dot material by blue light to generate white light, may achieve 100% of NTSC (National Television Standards Committee) color gamut.

Figure 1:
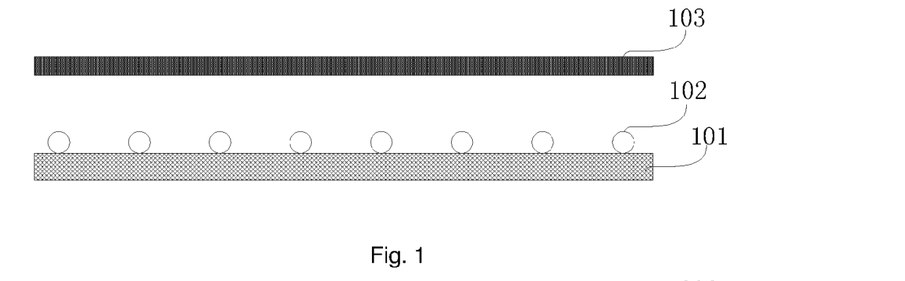
FIG. 1 is a structure diagram of a diaphragm coated with quantum dots in the prior art.

In the prior art, quantum dots of different sizes may be excited by irradiation of the blue light to release red light and green light of high purity, which are then mixed with the remaining pure blue light to obtain white light of high brightness. At present, when quantum dots are applied to a direct or bottom-type display, a back-light module in the industry employs a method of coating quantum dots on a diaphragm, and its specific structure is as shown in FIG. 1: a light-emitting chip 102 is arranged on a back plate 101, and blue light emitted from the light-emitting chip 102 is irradiated onto a diaphragm 103 coated with quantum dots so that the quantum dot material on the diaphragm 103 coated with quantum dots can be excited to emit red light and green light of high purity. In this solution, since the entire diaphragm 103 needs to be coated with the quantum dot material, the usage amount of the quantum dots is relatively large, resulting in relatively high cost of this solution.

Figure 2A:
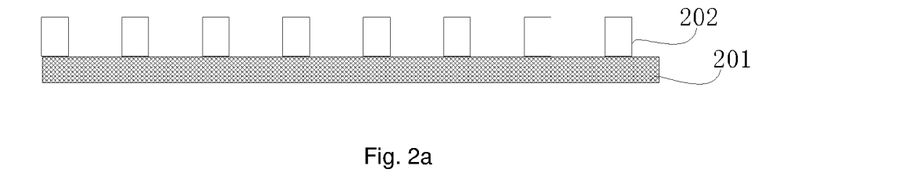
FIG. 2a is a structure diagram of a point light source provided with a quantum dot layer in the prior art.
Figure 2B:
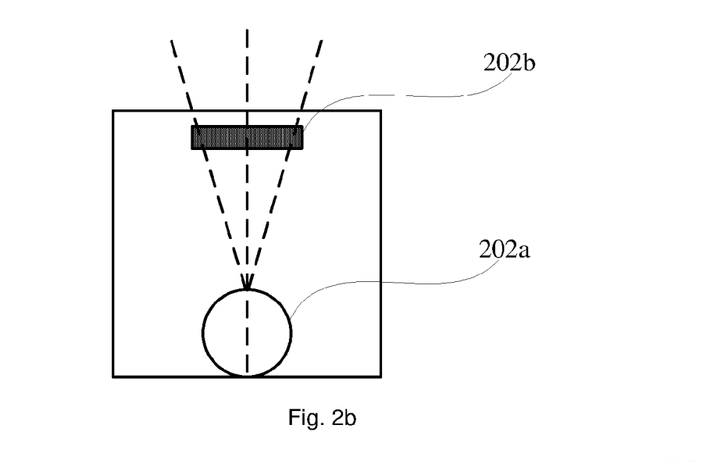

In order to solve the problem of high cost, another solution in the industry is to arrange quantum dots above an LED (Light Emitting Diode) chip as point light sources. FIG. 2 schematically shows a structure diagram of a back-light module employing such point light sources. As shown in FIG. 2a, a plurality of point light sources 202 are arranged on a back plate 201. Each point light source 202, the structure of which is as shown in FIG. 2b, includes an LED chip 202a, and a quantum dot layer 202b arranged above the LED chip 202a. In this way, the usage amount of quantum dots is saved.

However, the light intensity of the LED chip 202a in each point light source 202 shows Lambertian distribution, i.e., a unit area having a smaller light-emitting angle of the LED chip 202a results in higher light power, and the power of light in a unit area having a small angle, irradiated onto the quantum dot layer 202b, may reach 60-100 W/cm². As shown in FIG. 2b, the light power received by a region of the quantum dot layer 202b directly facing the LED chip 202a is higher than that received by a region diagonally opposite to the LED chip, and the temperature of a region in the quantum dot layer receiving high light power is higher than the temperature of a region in the quantum dot layer receiving low light power. Since the failure of the quantum dot material will be caused at high temperature, the limit of irradiation of blue light that the quantum dot layer may withstand is generally below 5 W/cm². Therefore, the quantum dot layer 202b right above the LED chip 202a is more likely to be irradiated by blue light of high intensity, resulting in the failure of the quantum dots.

SUMMARY OF THE DISCLOSURE

An embodiment of the present disclosure provides a quantum dot light-emitting device, including:
a pedestal;
a light-emitting chip arranged on the pedestal; and
a quantum dot layer arranged on the pedestal, the quantum dot layer being located in a light emergent side of the light-emitting chip with a gap being arranged between the quantum dot layer and the light-emitting chip, wherein reflection points are arranged on a surface of the quantum dot layer opposite to the light-emitting chip, the reflection points being at least distributed in a region of the quantum dot layer directly facing the light-emitting chip.

Another embodiment of the present disclosure provides a display device, including:
a direct or bottom-type back-light module, including:
a back plate;
a plurality of quantum dot light-emitting devices provided by the above embodiment, the quantum dot light-emitting devices being arranged on the back plate; and
an optical diaphragm group arranged on a light emergent side of the quantum dot light-emitting devices; and
a display panel arranged on a light emergent side of the direct or bottom-type back-light module.

Still another embodiment of the present disclosure provides a display device, including:
an edge-type back-light module, including:
a reflector film;
a light guide plate, the light guide plate having a light incident surface, a light emergent surface and a reflecting surface, and the reflector film being arranged on the reflecting surface of the light guide plate; and
a plurality of quantum dot light-emitting devices provided by the above embodiments, the quantum dot light-emitting devices being arranged on the side of the light incident surface of the light guide plate; and
an optical diaphragm group arranged on the side of the light emergent surface of the light guide plate; and
a display panel arranged on a light emergent side of the edge-type back-light module.

BRIEF DESCRIPTION OF THE DRAWINGS

In order to more clearly illustrate the embodiments of the present disclosure or the technical solutions in the prior art, the accompanying drawings to be used in description of the embodiments or the prior art will be briefly described as below. Apparently, the drawings in the following description are only some of embodiments of the present disclosure, and a person of ordinary skill in the art may obtain other drawings according to these drawings without paying any creative effort.

FIG. 2b is a structure diagram of a quantum dot layer arranged above an LED chip of FIG. 2a;

DETAILED DESCRIPTION OF THE PREFERRED EMBODIMENTS

The technical solutions in the embodiments of the present disclosure will be described clearly and completely as below with reference to the figures in the embodiments of the present disclosure. Apparently, the described embodiments are only part, not all, of the embodiments of the present disclosure. Based on the embodiments of the present disclosure, all other embodiments, obtained by a person of ordinary skill in the art without paying any creative effort, should fall into the protection scope of the present disclosure.

In a quantum dot light-emitting device according to the embodiments of the present disclosure, reflection points are arranged on a surface of the quantum dot layer opposite to the light-emitting chip, and the reflection points are at least distributed in a region of the quantum dot layer directly facing the light-emitting chip, thereby solving a problem of non-uniform light irradiation in the prior art.

In the embodiments of the present disclosure, the involved technical terms are as follows:

1. Back-light source: to provide a light source with uniform brightness distribution in a plane for a TFT-LCD (Thin Film Transistor Liquid Crystal Display).

2. Direct or bottom back-light type: to arrange illuminants directly below the display screen, and uniformly distribute a large number of illuminants on the entire back-light surface.

3. Diffuser film: including an upper diffuser film, located on the side of the display screen, for preventing the display screen from being scratched due to direct contact with a prism pattern on a prism sheet, also called protector film; and a lower diffuser film, located on the side of the light source, for allowing light to pass through a diffusion coating to generate diffuse reflection, thus to uniformly distribute light and ensure the uniformity of the brightness of the back-light source in a plane.

4. Prism sheet: located between the upper diffuser film and the lower diffuser film, and served as a light condenser to condense light from the lower diffuser film within a certain angle range by total reflection and refraction and then emit the light, thus to improve the brightness in sight.

5. Reflector film: configured to reflect light from light sources, such as a CCFL (Cold Cathode Fluorescent Lamp) or an LED, into the light guide plate or the diffuser films, thus to improve the light utilization of the back-light source.

6. Quantum dots: which are nano-particles composed of compounds of II-VI or III-V elements. The quantum size effect of the quantum dots leads to a great change in photoelectric properties of semiconductor quantum dots, and when the size of the semiconductor quantum dot particles is smaller than the Bohr radius of excitons, the resulting quantum size effect changes the energy level structure of the semiconductor material so that the semiconductor material changes to a discrete energy level structure having molecular properties from a continuous energy band structure. With this phenomenon, semiconductor quantum dots of different grain diameters may be prepared in a same reaction and light emission of different frequencies may be generated, so that it is convenient to obtain various light-emitting colors.

Figure 3:
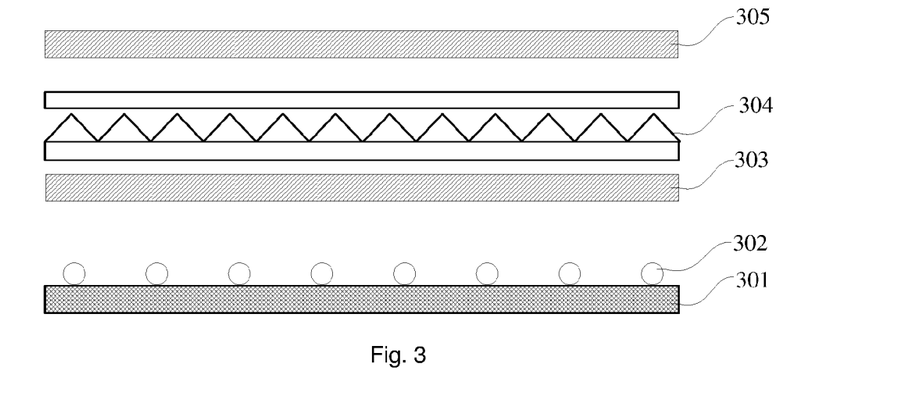
FIG. 3 is an optical structure diagram of a direct or bottom-type back-light module applicable to embodiments of the present disclosure.

FIG. 3 schematically shows a cutaway view of an optical structure of a direct or bottom-type back-light module applicable to the embodiments of the present disclosure. As shown in FIG. 3, the back-light module includes a back plate 301, point light sources 302, a lower diffuser film 303, a prism sheet 304 and an upper diffuser film 305. The point light sources 302 may be LED light-emitting chips, may be cold cathode fluorescent tubes and may also be EL (Electroluminescent) lamps, just to name a few.

As shown in FIG. 3, light from the point light sources 302 is irradiated onto the lower diffuser film 303, and light coming out from the lower diffuser film 303 will be more uniformly irradiated onto the prism sheet 304. The light scattered from the lower diffuser film 303 is condensed within a certain angle by the prism sheet 304 and emitted toward the upper diffuser film, so as to provide a light source with uniform brightness distribution in a plane for the display screen. In this embodiment, if CCFLs or LEDs are used as the light sources, it is required to design a reflector film at the bottom of the back-light source, i.e., on the back plate 301 in FIG. 3, to reflect light irradiated from the CCFLs or LEDs. For an ordinary LED TV set, it is usually needed to produce white light by blue LED chips and yellow fluorescent powder, or by ultraviolet (near ultraviolet) LEDs and red, green and blue fluorescent powder, or by integrally packaging independent red, green and blue LEDs. However, in the above method, the purity of the produced red, green and blue primary colors is not enough, resulting in fewer colors which may be formed by mixing the red, green and blue primary colors, so that the shown color gamut is relatively narrow. As a result, most of the blue color and the green color and part of the red color in the display screen cannot be accurately displayed.

Researches show that the quality of the color gamut of a display is related to many indexes of a TV set, and one of the important indexes is the back-light source. According to the explaination of the above technical terms, it can be understood that the back-light source mainly plays a role of providing a light source with uniform brightness distribution in a plane, and a main factor for the back-light source to influence the color gamut of the display depends on the purity of red, green and blue light waves. When excited by electricity or light, the quantum dots will emit a variety of monochromatic light of different colors with very high purity depending on the respective radius of those quantum dots. The red, green and blue light of higher purity may be mixed to form white light of high purity, so the color gamut of the display will be higher and most of the blue, green and red colors in the display screen may be accurately displayed.

In the prior art, a quantum dot layer is generally arranged right above an LED chip. However, due to the problem that the failure of the quantum dots will be caused at high temperature, when the quantum dots are applied to the back-light source, the light power received by the region of the quantum dot layer directly facing the LED chip may be high, which is caused by the arrangement of the quantum dot layer right above the LED chips, thereby generating a temperature which cannot be withstood by the quantum dots. As a result, the failure of the quantum dots is caused, and the display effect of the display screen is thus influenced.

Based on the above analysis, the problem that the failure of the quantum dots will be caused at high temperature is taken into consideration. In the embodiments of the present disclosure, a method is provided for arranging reflection points on a quantum dot layer in a region of the quantum dot layer directly facing the light-emitting chip, light irradiated onto the region of the quantum dot layer directly facing the light-emitting chip is reflected by the reflection points arranged in the region of the quantum dot layer directly facing the light-emitting chip, thereby preventing the quantum dots in the region directly facing the light-emitting chip from receiving high light power to generate a temperature which cannot be withstood by the quantum dots, and thus avoiding the problem of the failure of the quantum dots, the non-uniform light irradiation received by light source devices and influence to the display effect of the display.

Figure 4A:
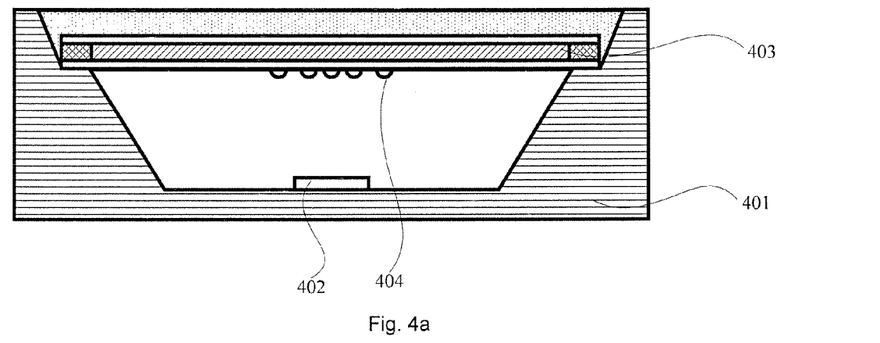
FIG. 4a is a structure diagram of a quantum dot light-emitting device according to the embodiments of the present disclosure.

FIG. 4a schematically shows a structure diagram of a quantum dot light-emitting device according to one embodiment of the present disclosure. The quantum dot light-emitting device may be regarded as a point light source of a back-light module.

As shown in FIG. 4a, a quantum dot light-emitting device according to one embodiment of the present disclosure mainly includes a pedestal 401, a light-emitting chip 402, a quantum dot layer 403 and reflection points 404. The light-emitting chip 402 is arranged on the pedestal 401; the quantum dot layer 403 is arranged on the pedestal 401, and located in a light emergent side of the light-emitting chip 402 with a gap being arranged between the quantum dot layer 403 and the light-emitting chip 402; the reflection points 404 are arranged on a surface of the quantum dot layer 403 opposite to the light-emitting chip 402, and the reflection points 404 are at least distributed in a region of the quantum dot layer 403 directly facing the light-emitting chip 402.

It should be noted that, said "the reflection points 404 are at least distributed in a region of the quantum dot layer 403 directly facing the light-emitting chip 402" means that the reflection points 404 not only may be distributed in a region of the quantum dot layer 403 directly facing the light-emitting chip 402, but also may be distributed in a larger region of the quantum dot layer 403, for example, may be distributed on the entire quantum dot layer 403. In addition, "distributed" here generally means the scattered arrangement of a plurality of reflection points in a certain region, one of the reflection points may be spaced apart from other reflection points and may also be close to one or more other reflection points, as long as part of light irradiated onto the region (with reflection points distributed therein) of the quantum dot layer 403 may pass through gaps between the reflection points and part of light may be reflected by the reflection points.

In the embodiments of the present disclosure, since reflection points are arranged on a surface of the quantum dot layer opposite to the light-emitting chip, and the reflection points are at least distributed in a region of the quantum dot layer directly facing the light-emitting chip, that is, the reflection points arranged in a region directly facing the light-emitting chip may reflect part of light from the region of the light-emitting chip directly facing the quantum dot layer, the light power received by the quantum dot layer in the region directly facing the light-emitting chip from the light-emitting chip is reduced, and the failure of the quantum dot layer in the region directly facing the light-emitting chip due to high temperature is avoided. Moreover, since the reflection points reflect light from a direction of the light-emitting chip right opposite to the quantum dot layer to make the reflected light enter the quantum dot layer from an edge portion of the quantum dot layer, the light irradiation received by the quantum dot layer in the quantum dot light-emitting device is relatively uniform.

As shown in FIG. 4a, in the embodiment of the present disclosure, the pedestal 401 is groove-shaped, the light-emitting chip 402 is arranged at a groove bottom of the pedestal 401, and the quantum dot layer is arranged at a groove opening of the pedestal 401. The pedestal 401, the light-emitting chip 402 and the quantum dot layer 403 are packaged to form an integral structure, so as to form a first quantum dot light-emitting device. In the prior art, since the distance between the light-emitting chip 402 and the quantum dot layer 403 is relatively small, if light from the light-emitting chip 402 is directly irradiated onto the quantum dot layer in the region directly facing the light-emitting chip 402, it is easy to result in the failure of the quantum dot material in the region of the quantum dot layer directly facing the light-emitting chip. While in the embodiment of the present disclosure, because the reflection points 404 are arranged in the region of the quantum dot layer directly facing the light-emitting chip, and the reflection points 404 will reflect light emitted from the light-emitting chip 402, the light paths of light emitted from the light-emitting chip 402 can be changed, and light emitted from the light-emitting chip 402 may be reflected to the pedestal 401, thus avoiding the failure of the quantum dot material in the region of the quantum dot layer 403 directly facing the light-emitting chip 402.

In one embodiment of the present disclosure, a plurality of light-emitting chips 402 may be arranged at the groove bottom of the pedestal 401, while the quantum dot layer 403 is arranged at the groove opening of the pedestal 401. The groove opening of the pedestal may correspond to a light guide plate, that is, the quantum dot layer 403 is arranged on a lower side of the light guide plate. In one embodiment of the present disclosure, the groove opening may correspond to optical diaphragm group, that is, the quantum dot layer 403 is arranged on a lower side of the optical diaphragm group. In the above embodiments, since the distance between the quantum dot layer and the light-emitting chip is relatively large, the failure of the quantum dot material in the region of the quantum dot layer directly facing the light-emitting chip will not be caused by irradiation of the light-emitting chip. Moreover, since the reflection points are arranged in the region of the quantum dot layer directly facing the light-emitting chip and the reflection points will reflect light from the region of the light-emitting chip directly facing the quantum dot layer, the transmission direction of light emitted from the light-emitting chip is changed, and light from the region of the light-emitting chip directly facing the quantum dot layer is reflected to the pedestal, so that light irradiated onto the quantum dot layer is more uniform.

In one embodiment of the present disclosure, in order to improve the utilization of light emitted from the light-emitting chip, a groove inner wall of the pedestal may reflect light. As an example, the groove inner wall of the pedestal is coated with a reflecting layer. As another example, the material of the pedestal may have a characteristic of reflecting visible light, and further may have characteristics of resisting blue light radiation and high temperature.

Figure 4B:
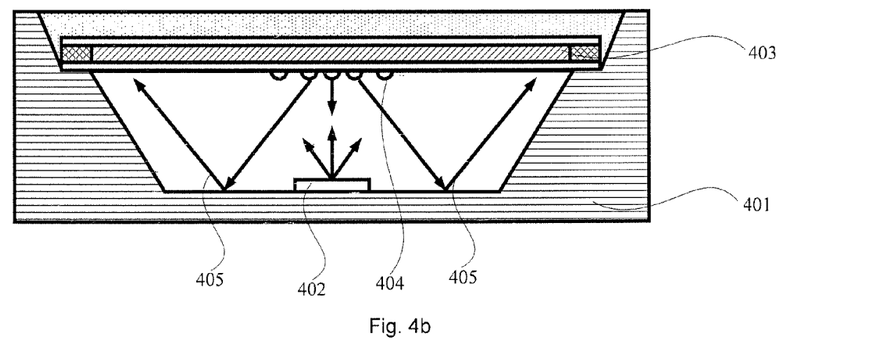
FIG. 4b is a schematic diagram of light paths formed by a light emitted from a light-emitting chip, the light being reflected by reflection points and then irradiated again onto the quantum dot layer according to the embodiments of the present disclosure.

FIG. 4b schematically shows a schematic diagram of light paths, in the light-emitting device, of light emitted from the light-emitting chip. Referring to FIG. 4b, the reflection points 404 arranged in the region of the quantum dot layer 403 directly facing the light-emitting chip 402 will reflect light emitted from the light-emitting chip 402 to the pedestal 401. Because the pedestal 401 may reflect light, the pedestal 401 may reflect light reflected from the reflection points 404 again, so that light reflected by the reflection points 404, after being reflected by the pedestal 401, is irradiated onto the quantum dot layer 403. By this method, light emitted from the light-emitting chip 402 may be uniformly irradiated onto the quantum dot layer 403, and the failure of the quantum dots in the region of the quantum dot layer 403 directly facing the light-emitting chip 402 due to high temperature irradiation is avoided. Further, due to the characteristics of resisting blue light radiation and high temperature of the pedestal 401, even if the intensity of light reflected by the reflection points 404 is relatively high, the failure of the pedestal 401, which will influence the light reflected by the reflection points 404 to be reflected again, will not be caused. Preferably, the material of the pedestal may be EMC (Epoxy Molding Compound). In the embodiments of the present disclosure, the material of the pedestal is not specifically limited.

In one embodiment of the present disclosure, in order to better protect the quantum dots, a layer of substrate is respectively arranged above and below the quantum dots and the quantum dots are sealed between the upper substrate and the lower substrate. A packaging process for sealing the quantum dots between the upper substrate and the lower substrate is generally laser melting or burning. In practical application, however, if the quantum dots are directly sealed between the upper substrate and the lower substrate, the failure of the quantum dots near the sealing sites of the upper substrate and the lower substrate will be caused due to high temperature. In one embodiment of the present disclosure, in order to avoid the failure of the quantum dot material by high temperature in the sealing process, water-oxygen isolating material will be arranged around the quantum dots while the quantum dots are sealed between the upper substrate and the lower substrate.

Figure 4C:
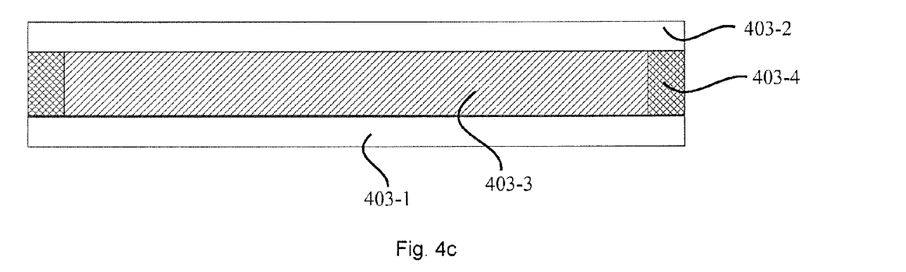
FIG. 4c is a structure diagram of a quantum dot layer according to the embodiments of the present disclosure.

FIG. 4c schematically shows a structure diagram of a quantum dot layer according to one embodiment of the present disclosure. Referring to FIG. 4c, the quantum dot layer includes a first substrate 403-1, a second substrate 403-2, quantum dots 403-3 and water-oxygen isolating material 403-4 arranged around the quantum dots 403-3. The first substrate 403-1 and the second substrate 403-2 are oppositely arranged, and the quantum dots 403-3 and the water-oxygen isolating material 403-4 are both sealed between the first substrate 403-1 and the second substrate 403-2. Preferably, the first substrate and the second substrate may be glass substrates. In the embodiments of the present disclosure, the material of the first substrate and the second substrate is not specifically limited.

Due to the water-oxygen isolating material arranged around the quantum dots, on one hand, the quantum dots are saved, and the failure of the quantum dots due to high temperature in the high temperature sealing process is avoided; and on the other hand, the failure of the quantum dots when exposed to water or oxygen is avoided. Preferably, the water-oxygen isolating material may be silicon dioxide. In the embodiments of the present disclosure, the composition material of the water-oxygen isolating material is not specifically limited.

In one embodiment of the present disclosure, the quantum dot material includes red quantum dots, green quantum dots and resin. The quantum dots may efficiently convert light from the light-emitting chip into red light or green light approximate to monochromatic light due to their high luminous efficiency and narrow emission line, thereby improving the color gamut and the display quality of pictures. Because the quantum dot layer includes quantum dots with different sizes, light from the light-emitting chip may be converted into light of different color. Generally, the size of red light quantum dots is about 7 nm and the size of green light quantum dots is about 3 nm.

Core-shell quantum dots convert light from the light-emitting chip. The quantum dots with a core-shell structure are more excellent in the luminescent property in terms of absorption and emission spectrum, so that the surface defects of nano-particles may be obviously reduced, and the luminous efficiency may be greatly improved. Therefore, the core-shell red light quantum dots and the core-shell green light quantum dots are conducive to improving the luminous efficiency. Preferably, the red light quantum dots and the green light quantum dots may be core-shell quantum dots. In the embodiments of the present disclosure, the material of the red quantum dots and the green quantum dots is not specifically limited.

Because of shorter wavelength and higher energy of blue light, the red quantum dots and the green quantum dots may be excited by blue light, and then the blue light is converted into red light and green light, respectively. In one embodiment of the present disclosure, the light-emitting chip may be preferably a light-emitting chip emitting blue light, for example, a blue chip. Blue light emitted by the blue chip is approximate to monochromatic light, so the color gamut and the display quality of pictures may be further improved by irradiating the red quantum dots and the green quantum dots with a blue chip.

In the embodiments of the present disclosure, in order to better avoid the failure of the quantum dot material caused by irradiating the quantum dot layer in the region opposite to the light-emitting chip by high-intensity light emitted from the light-emitting chip, reflection points are arranged on a surface of the quantum dot layer opposite to the light-emitting chip, and the reflection points are at least distributed in the region of the quantum dot layer directly facing the light-emitting chip. The reflection points may reflect light emitted from the light-emitting chip and irradiated onto the reflection points. Further, the reflection points are made of material with a reflection characteristic. Preferably, the material of the reflection points includes reflection material selected from one or more of $SiO_2$, $CaCO_3$, $TiO_2$ and $BaSO_4$. In the embodiments of the present disclosure, the material of the reflection points is not specifically limited.

In one embodiment of the present disclosure, the reflection points may be arranged in such a way that the density thereof is reduced from a center of the region directly facing the light-emitting chip to an edge of the quantum dot layer, so that the difference in light intensity, between light received by the region of the quantum dot layer directly facing the light-emitting chip from the light-emitting chip and light received by the peripheral region of the quantum dot layer from the light-emitting chip, may be decreased effectively. It may be understood that, with regard to how to arrange the reflection points in such a way that the density thereof is reduced from a center of the region directly facing the light-emitting chip to an edge of the quantum dot layer, it may be achieved by regulating the distance and the area or in other well-known ways by a person of ordinary skill in the art, and will not be specifically limited here.

With regard to the formation of the reflection points, preferably, the reflection points may be arranged in the quantum dot layer by printing, that is, printing ink in the quantum dot layer to form the reflection points. The reflection points formed in this way are called printing dots. The ink may be made of material having high reflecting and scattering characteristics, wherein the material may contain one or more of reflecting material of the types as mentioned above. In the embodiments of the present disclosure, the way of arranging the reflection points in the quantum dot layer is not specifically limited.

In one embodiment of the present disclosure, the surface of the quantum dot layer opposite to the light-emitting chip further includes a second substrate. Therefore, to arrange the reflection points on the surface of the quantum dot layer opposite to the light-emitting chip is actually to arrange the reflection points on the second substrate. The second substrate is generally made of glass.

Because both the quantum dot layer and the light-emitting chip are arranged on the pedestal, and the quantum dot layer is located in a light emergent side of the light-emitting chip, it is required to fix the quantum dot layer onto the pedestal from an upper side with transparent and viscous material. Preferably, the transparent and viscous material may be silica gel. In the embodiments of the present disclosure, the transparent and viscous material is not specifically limited.

Based on the same inventive concept and different distributions of the reflection points in the quantum dot layer, the embodiments of the present disclosure further include at least the following specific implementations, specifically referring to Embodiment 1 to Embodiment 4.

Embodiment 1

Figure 5A:
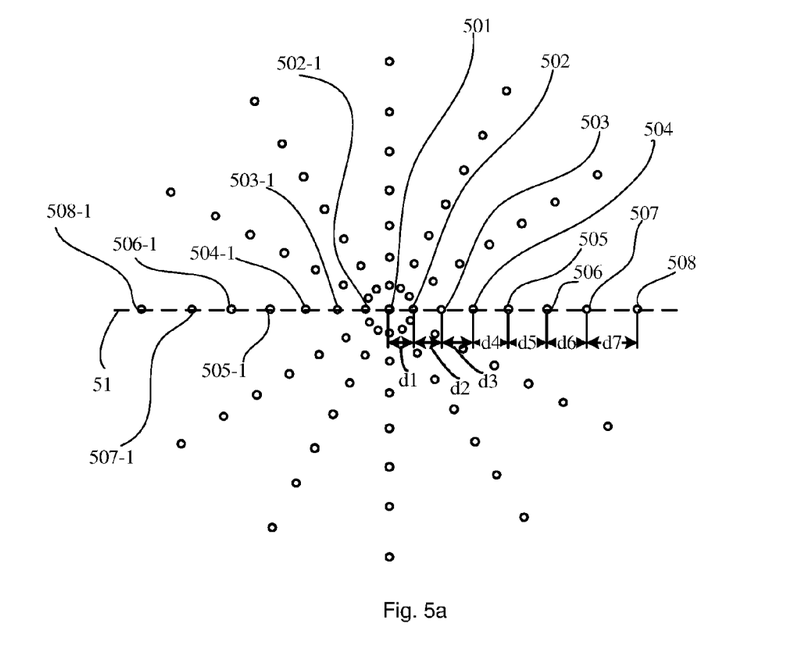
FIG. 5a is a schematic diagram of distribution of reflection points in the quantum dot layer according to the embodiments of the present disclosure.
Figure 5B:
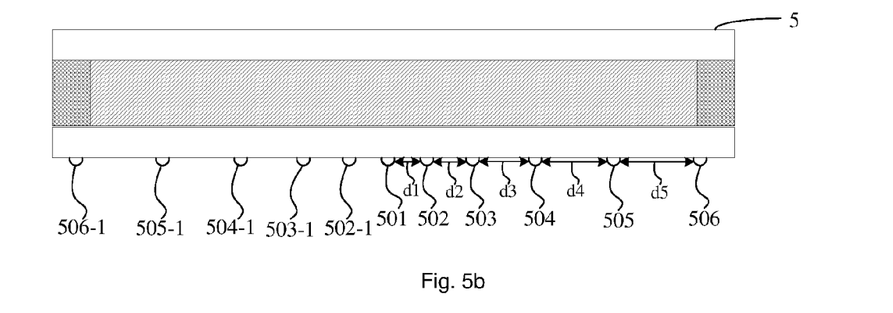
FIG. 5b is a cutaway view of a plurality of reflection points, distributed on any one of straight lines of FIG. 5a, in the quantum dot layer.

A quantum dot light-emitting device, at least provided with reflection points in a region of a quantum dot layer opposite to a light-emitting chip, according to an embodiment of the present disclosure will be further illustrated as below with reference to FIG. 5a and FIG. 5b. FIG. 5a schematically shows a schematic diagram of distribution of reflection points in the quantum dot layer according to one embodiment of the present disclosure. FIG. 5b is a cutaway view of a plurality of reflection points, distributed on any one of straight lines of FIG. 5a, in the quantum dot layer.

The embodiment of the present disclosure only further defines the distribution of reflection points in the quantum dot layer. Other structures related to the quantum dot light-emitting device may refer to the above embodiments.

In the embodiment of the present disclosure, FIG. 5a shows the specific distribution of reflection points in the quantum dot layer. The reflection points are distributed on the entire region of the quantum dot layer. That is, the reflection points are distributed not only in a region directly facing the light-emitting chip, but also in regions other than the region directly facing the light-emitting chip. In a straight line passing through the center of the region directly facing the light-emitting chip, the distance between any two adjacent reflection points is gradually increased from the center to the edge of the quantum dot layer.

Referring to FIG. 5a, taking a reflection point 501 at a central point of the region directly facing the light-emitting chip as an example, there are reflection points distributed on any one of straight lines formed of the reflection point 501 and reflection points adjacent to it, and in any one of the straight lines, a plurality of reflection points, distributed by regarding the reflection point 501 as a center, are symmetrically distributed.

For example, a plurality of reflection points are distributed on a straight line 51 passing through the reflection point 501, and the plurality of reflection points are distributed on two sides of the reflection point 501. The distance between the reflection point 501 and an adjacent reflection point 502 is d1, and because a reflection point 502 and a reflection point 502-1 are symmetrically distributed about the reflection point 501 and have a same distance from the reflection point 501, it can be determined that the distance between the reflection point 502-1 and the reflection point 501 is also d1. The distance between the reflection point 502 and an adjacent reflection point 503 is d2, and because a reflection point 503-1 and a reflection point 503 are symmetrically distributed about the reflection point 501 and have a same distance from the reflection point 501, and the respective distances of the reflection point 502 and the reflection point 502-1 from the reflection point 501 are both d1, it can be determined that the distance between the reflection point 503-1 and the reflection point 502-1 is d2. Moreover, referring to FIG. 5a, d2 is greater than d1. According to the above rule, it may be further determined that the distance between a reflection point 504 and the reflection point 503 is d3, the distance between a reflection point 504-1 and the reflection point 503-1 is also d3, and d3 is greater than d2; the distance between a reflection point 505 and the reflection point 504 is d4, the distance between a reflection point 505-1 and the reflection point 504-1 is also d4, and d4 is greater than d3; the distance between a reflection point 506 and the reflection point 505 is d5, the distance between a reflection point 506-1 and the reflection point 505-1 is also d5, and d5 is greater than d4; the distance between a reflection point 507 and the reflection point 506 is d6, the distance between a reflection point 507-1 and the reflection point 506-1 is also d6, and d6 is greater than d5; and the distance between a reflection point 508 and the reflection point 507 is d7, the distance between a reflection point 508-1 and the reflection point 507-1 is also d7, and d7 is greater than d6.

According to the above analysis and as shown in FIG. 5a, it may be determined that the distance between any two adjacent reflection points, distributed on any straight line passing through a reflection point in the region directly facing the light-emitting chip, is gradually increased from the center of the region directly facing the light-emitting chip to the edge of the quantum dot layer. For example, the distance d1 between the reflection point 501 and the reflection point 502 is less than the distance d2 between the reflection point 502 and the reflection point 503, and the distance d2 between the reflection point 503 and the reflection point 502 is less than the distance d3 between the reflection point 504 and the reflection point 503. Similarly, the distance d6 between the reflection point 506 and the reflection point 507 is less than the distance d7 between the reflection point 508 and the reflection point 507.

Referring to FIG. 5b, a plurality of reflection points are arranged on a surface of the quantum dot layer 5 opposite to the light-emitting chip (not shown), and the plurality of reflection points are symmetrically distributed by regarding a reflection point 501 at a central point of a region directly facing light-emitting chip as a center. For example, the distance between the reflection point 502 and the reflection point 501 is d1, and because the reflection point 502 and the reflection point 502-1 are symmetrically distributed by regarding the reflection point 501 as a center, the distance between the reflection point 502-1 and the reflection point 501 is also d1; and the distance between the reflection point 503 and the reflection point 502 is d2, and because the reflection point 503 and a reflection point 503-1 are symmetrically distributed by regarding the reflection point 501 as a center, and the respective distances of the reflection point 502 and the reflection point 502-1 from the reflection point 501 are both d1, it may be determined that the distance between the reflection point 503-1 and the reflection point 502-1 is also d2. Moreover, referring to FIG. 5b, d2 is greater than d1. Further, the distance between a reflection point 504 and the reflection point 503 is d3, and the distance between the reflection point 504-1 and the reflection point 503-1 is d3; the distance between the reflection point 505 and the reflection point 504 is d4, and the distance between the reflection point 505-1 and the reflection point 504-1 is d4; the distance between the reflection point 506 and the reflection point 505 is d5, and the distance between the reflection point 506-1 and the reflection point 505-1 is d5. Moreover, referring to FIG. 5b, d5 is greater than d4, d4 is greater than d3, and d3 is greater than d2.

According to the above analysis, it may be determined that, for reflection points distributed on any straight line passing through a reflection point in the center of the region directly facing the light-emitting chip, the distance between the reflection point in the center of the region directly facing the light-emitting chip and any one of adjacent reflection points is less than that between any other two adjacent reflection points distributed on any straight line passing through the reflection point in the region directly facing the light-emitting chip, and the distance between any two adjacent reflection points away from the reflection point in the center of the region directly facing the light-emitting chip will be gradually increased. It is known that the light intensity of the light-emitting chip shows Lambertian distribution, i.e. the light power in a unit area having a small angle is higher than that in a unit area having a large angle. However, in the embodiment of the present disclosure, even if there are problems that the light power in a unit area having a small angle is high and more photons pass through thereof in a unit time because the light intensity of the light-emitting chip shows Lambertian distribution, the difference in light intensity, between light received by the region of the quantum dot layer directly facing the light-emitting chip from the light-emitting chip and light received by the peripheral region of the quantum dot layer from the light-emitting chip, may be decreased effectively. Because there are more reflection points arranged in the region of the quantum dot layer directly facing the light-emitting chip than those arranged in the peripheral region of the quantum dot layer, the probability of reflecting light emitted from the light-emitting chip by the reflection points arranged in the region of the quantum dot layer directly facing the light-emitting chip is higher than that by the reflection points arranged in the peripheral region of the quantum dot layer. After being irradiated onto the reflection points in the region directly facing the light-emitting chip, light emitted from the light-emitting chip will be reflected by the reflection points, and the light path of light emitted from the light-emitting chip is changed, so that light emitted from the light-emitting chip is reflected to the pedestal, and due to the reflection effect of the pedestal, light emitted from the light-emitting chip will be reflected by the pedestal again, and light reflected again may enter the quantum dot layer from the peripheral regions of the quantum dot layer. With this method according to the embodiment of the present disclosure, the failure of the quantum dots in the quantum dot layer due to high power irradiation from the light-emitting chip may be avoided, and it is also ensured that the quantum dot layer may uniformly receive light emitted from the light-emitting chip.

In some embodiments of the present disclosure, a plurality of reflection points are arranged on the surface of the quantum dot layer opposite to the light-emitting chip, and distributed on a straight line passing through the center of the region directly facing the light-emitting chip. Preferably, any of the straight lines passes through the center of the region directly facing the light-emitting chip and there is a reflection point in the center of the region directly facing the light-emitting chip; and a plurality of reflection points in any straight line are symmetrically distributed by regarding the reflection point in the center of the region directly facing the light-emitting chip as a center. Further, any of the straight lines passes through the center of the region directly facing the light-emitting chip and there may be no reflection point in the center of the region directly facing the light-emitting chip, but a plurality of reflection points in any straight line are still symmetrically distributed by regarding the region directly facing the light-emitting chip as a center. In the embodiments of the present disclosure, whether a reflection point is arranged in the center of the region directly facing the light-emitting chip or not is not specifically limited.

In some embodiments of the present disclosure, a plurality of quantum dots are arranged on the surface of the quantum dot layer opposite to the light-emitting chip, and a plurality of reflection points are symmetrically distributed by regarding a reflection point in the center of the region directly facing the light-emitting chip as a center. Preferably, the shape of the plurality of quantum dots arranged on the surface of the quantum dot layer opposite to the light-emitting chip is hemispherical. Further, the shape of the plurality of quantum dots arranged on the surface of the quantum dot layer opposite to the light-emitting chip may also be in an irregular shape. In the embodiments of the present disclosure, the shape of the plurality of quantum dots arranged on the surface of the quantum dot layer opposite to the light-emitting chip is not specifically limited.

In some embodiments of the present disclosure, a plurality of quantum dots are arranged on the surface of the quantum dot layer opposite to the light-emitting chip, and when the shape of the quantum dots is hemispherical, preferably, the radius of the plurality of quantum dots is the same. Further, the radius of the plurality of quantum dots may be not the same. In the embodiments of the present disclosure, the radius of the plurality of quantum dots is not specifically limited.

In some embodiments of the present disclosure, a plurality of quantum dots are arranged on the surface of the quantum dot layer opposite to the light-emitting chip, and the plurality of reflection points are symmetrically distributed by regarding a reflection point in the center of the region directly facing the light-emitting chip as a center. Preferably, the distance between any two adjacent reflection points distributed on a same straight line may be progressively increased by a set value from the center of the region directly facing the light-emitting chip to the edge of the quantum dot layer. Further, the distance between any two adjacent reflection points distributed on a same straight line may also be progressively increased by any value from the center of the region directly facing the light-emitting chip to the edge of the quantum dot layer. Alternatively, the distance between the reflection points distributed on a same straight line may be progressively increased in an overall progressive increasing state from the center of the region directly facing the light-emitting chip to the edge of the quantum dot layer, however, whether the distance between any two adjacent reflection points is progressively increased or not is not specifically limited, for example, the distance between a the quantum dot 1 in the region directly facing the light-emitting chip and a quantum dot 2 which is adjacent to the quantum dot 1 is l2, while the distance between the quantum dot 2 and an adjacent quantum dot 3 is also l2, but the distance between a quantum dot 4 and a quantum dot 5 is l4, wherein l4 is larger than l2. In the embodiments of the present disclosure, the value, by which the distance between any two adjacent reflection points distributed on a same straight line from the center of the region directly facing the light-emitting chip to the edge of the quantum dot layer is progressively increased, is not specifically limited.

Embodiment 2

Figure 6A:
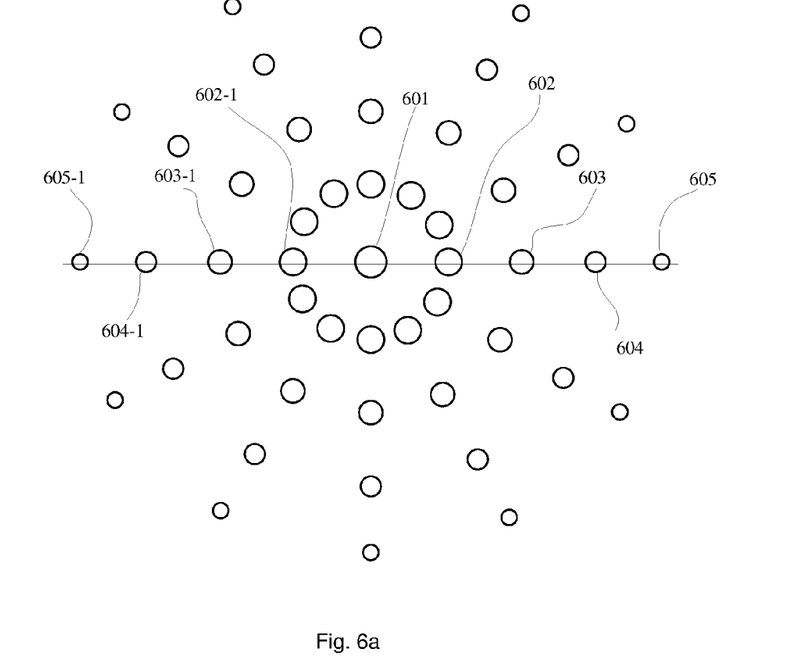
FIG. 6a is a schematic diagram of one distribution of reflection points in the quantum dot layer according to the embodiments of the present disclosure.
Figure 6B:
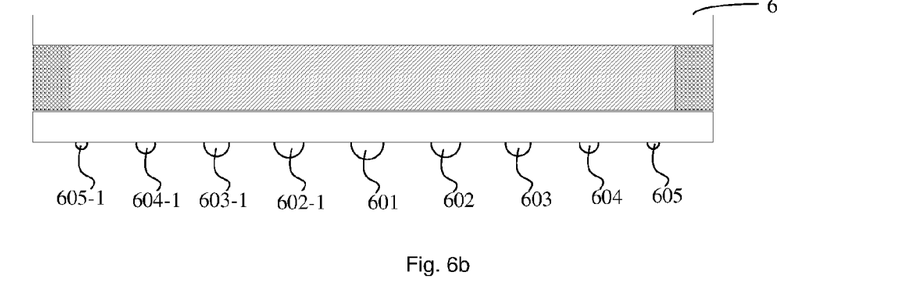
FIG. 6b is a cutaway view of a plurality of reflection points of FIG. 6a arranged in the quantum dot layer.

A quantum dot light-emitting device, at least provided with reflection points in a region of the quantum dot layer directly facing the light-emitting chip, according to an embodiment of the present disclosure will be further illustrated as below with reference to FIG. 6a and FIG. 6b. FIG. 6a schematically shows a schematic diagram of distribution of reflection points in the quantum dot layer according to one embodiment of the present disclosure. FIG. 6b is a cutaway view of a plurality of reflection points of FIG. 6a in the quantum dot layer.

This embodiment of the present disclosure only further defines the distribution of reflection points in the quantum dot layer. Other structures related to the quantum dot light-emitting device may refer to the above embodiments.

In this embodiment of the present disclosure, FIG. 6a shows the specific distribution of reflection points in the quantum dot layer. The reflection points are distributed in the entire region of the quantum dot layer. That is, the reflection points are distributed not only in a region directly facing the light-emitting chip, but also in other regions other than the region directly facing the light-emitting chip. The size of the reflection points is gradually decreased from the center of the region directly facing the light-emitting chip to the edge of the quantum dot layer.

Referring to FIG. 6a, taking a reflection point 601 at a central point of the region directly facing the light-emitting chip as an example, when the shape of the quantum dots is hemispherical, the reflection point 601 is located at the central point of the region of the quantum dot layer directly facing the light-emitting chip, the radius of the reflection point 601 is r1 (not shown), the radius of a reflection point 602 and the radius of a reflection point 602-1 are the same, i.e., both of them are r2 (not shown), and r1 is greater than r2, wherein the reflection point 602 and the reflection point 602-1 are adjacent to the reflection point 601 respectively. The radius of a reflection point 603 adjacent to the reflection point 602 is r3 (not shown), and correspondingly, the radius of a reflection point 603-1 adjacent to the reflection point 602-1 is also r3, and r2 is greater than r3. According to the above rule, it may be determined that the radius of a reflection point 605 adjacent to a reflection point 604 is r5 (not shown), and correspondingly, the radius of a reflection point 605-1 adjacent to the reflection point 604-1 is also r5, and r4 (not shown) is greater than r5.

Referring to FIG. 6b, a plurality of reflection points are arranged on a surface of a quantum dot layer 6 opposite to a light-emitting chip (not shown), and the radius of the reflection points is progressively decreased from the center of the region directly facing the light-emitting chip to the edge of the quantum dot layer. For example, the radius r1 of the reflection point 601 is greater than the radius r2 of the reflection point 602 and the reflection point 602-1, the radius r2 of the reflection point 602 is greater than the radius r3 of the reflection point 603, and the radius r2 of the reflection point 602-1 is greater than the radius r3 of the reflection point 603-1. Similarly, the radius r4 of the reflection point 604 is greater than the radius r5 of the reflection point 605. Correspondingly, the radius r4 of the reflection point 604-1 is greater than the radius r5 of the reflection point 605-1.

According to the above analysis, it may be determined that, for the plurality of reflection points arranged in the region of the entire the quantum dot layer, the radius of the reflection points in the region directly facing the light-emitting chip is greater than the radius of any one reflection point adjacent to the reflection points in the region directly facing the light-emitting chip, and the radius of the reflection points away from the region directly facing the light-emitting chip will be gradually decreased. It is known that the light intensity of the light-emitting chip shows Lambertian distribution, i.e. the light power in a unit area having a small angle is higher than that in a unit area having a large angle. However, in the embodiments of the present disclosure, even if there are problems that the light power in a unit area having a small angle is high and more photons pass through thereof in a unit time because the light intensity of the light-emitting chip shows Lambertian distribution, the difference in light intensity, between light received by the region of the quantum dot layer directly facing the light-emitting chip from the light-emitting chip and light received by the peripheral region of the quantum dot layer from the light-emitting chip, may be decreased effectively. The reflection points are arranged on the surface of the quantum dot layer opposite to the light-emitting chip, and the radius of the reflection points in the region directly facing the light-emitting chip is greater than that of any reflection point adjacent to the reflection points in the region directly facing the light-emitting chip, and the reflection points have a reflection effect, thus light received by the region of the quantum dot layer directly facing the light-emitting chip from the light-emitting chip may be reflected. Because the radius of the reflection points arranged in the region of the quantum dot layer directly facing the light-emitting chip is greater than that of the reflection points arranged in the peripheral region of the quantum dot layer, the probability of reflecting light emitted from the light-emitting chip by the reflection points arranged in the region of the quantum dot layer directly facing the light-emitting chip is higher than that by the reflection points arranged in the peripheral region of the quantum dot layer. After being irradiated onto the reflection points in the region directly facing the light-emitting chip, light emitted from the light-emitting chip will be reflected by the reflection points, and the light path of light emitted from the light-emitting chip is changed, so that light emitted from the light-emitting chip is reflected to the pedestal, and due to the reflection effect of the pedestal, light emitted from the light-emitting chip will be reflected by the pedestal again, and light reflected again may enter the quantum dot layer from the peripheral regions of the quantum dots layer. With this method according to the embodiment of the present disclosure, the failure of the quantum dots in the quantum dot layer due to high power irradiation from the light-emitting chip may be avoided, and it is also ensured that the quantum dot layer may uniformly receive light emitted from the light-emitting chip.

In some embodiments of the present disclosure, a plurality of quantum dots are arranged on the surface of the quantum dot layer opposite to the light-emitting chip. Preferably, the shape of the plurality of quantum dots arranged on the surface of the quantum dot layer opposite to the light-emitting chip is hemispherical. Further, the shape of the plurality of quantum dots arranged on the surface of the quantum dot layer opposite to the light-emitting chip may also be in an irregular shape. In the embodiments of the present disclosure, the shape of the plurality of quantum dots arranged on the surface of the quantum dot layer opposite to the light-emitting chip is not specifically limited.

In some embodiments of the present disclosure, a plurality of quantum dots are arranged on the surface of the quantum dot layer opposite to the light-emitting chip. Preferably, the radius of the reflection points may be regularly and progressively decreased by a set value from the center of the region directly facing the light-emitting chip to the edge of the quantum dot layer. Further, the radius of the reflection points may also be progressively decreased by any value from the center of the region directly facing the light-emitting chip to the edge of the quantum dot layer. Alternatively, the radius of the reflection points may be overall changed according to a rule of progressive decreasing from the center of the region directly facing the light-emitting chip to the edge of the quantum dot layer, however, there is no specific limit on whether the radius of any two adjacent reflection points is progressively decreased or not from the center of the region directly facing the light-emitting chip to the edge of the quantum dot layer. For example, the radius of a quantum dot 1 in the region directly facing the light-emitting chip is r1, the radius of a quantum dot 2 adjacent to the quantum dot 1 is r2, and the radius of a quantum dot 3 adjacent to the quantum dot 2 is also r2, but the radius of a quantum dot 5 is r4, wherein r1 is greater than r2, and r2 is greater than r4. In the embodiments of the present disclosure, there is no specific limit on progressively decreasing values of the radius of a plurality of quantum dots arranged on the surface of the quantum dot layer opposite to the light-emitting chip from the center of the region directly facing the light-emitting chip to the edge of the quantum dot layer.

In some embodiments of the present disclosure, a plurality of quantum dots are arranged on the surface of the quantum dot layer opposite to the light-emitting chip, when the radius of the reflection points may be regularly and progressively decreased by a set value from the center of the region directly facing the light-emitting chip to the edge of the quantum dot layer, preferably, the distance between any two adjacent reflection points is the same from the center of the region directly facing the light-emitting chip to the edge of the quantum dot layer. In the embodiments of the present disclosure, the distance between any two adjacent reflection points from the center of the region directly facing the light-emitting chip to the edge of the quantum dot layer is not specifically limited.

Embodiment 3

Figure 7:
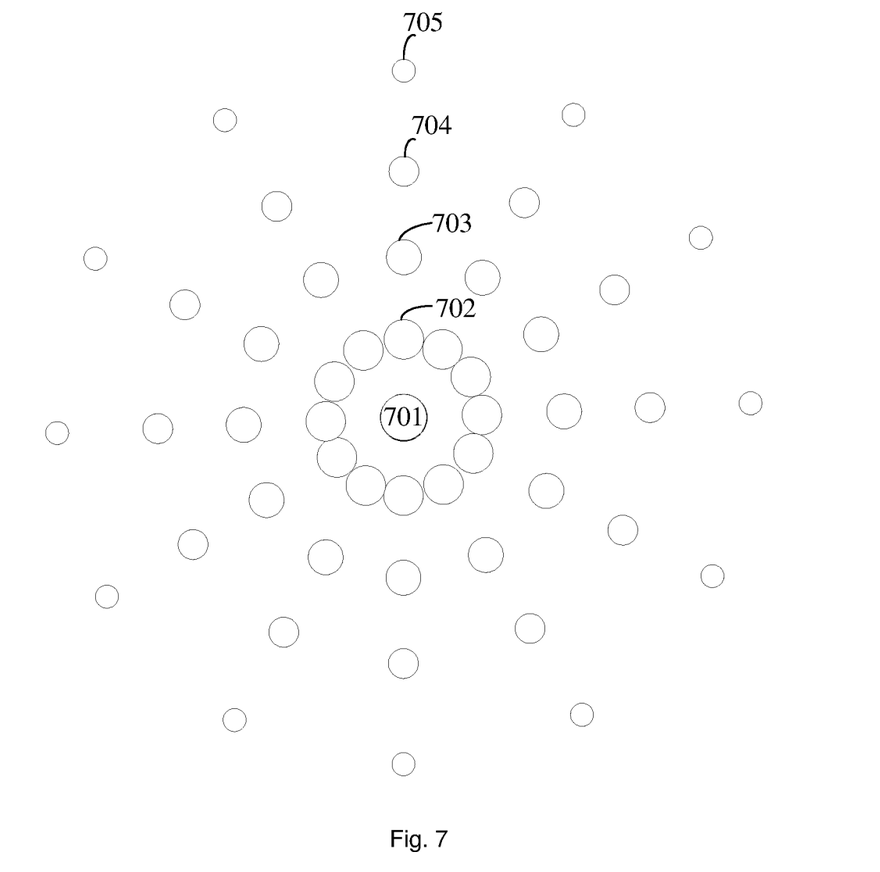
FIG. 7 is a schematic diagram of another distribution of reflection points in the quantum dot layer according to the embodiments of the present disclosure.

A quantum dot light-emitting device, at least provided with reflection points in a region of the quantum dot layer directly facing the light-emitting chip, according to an embodiment of the present disclosure will be further illustrated as below with reference to FIG. 7. FIG. 7 schematically shows a schematic diagram of distribution of reflection points in the quantum dot layer according to one embodiment of the present disclosure.

The embodiment of the present disclosure only further defines the distribution of reflection points in the quantum dot layer. Other structures related to the quantum dot light-emitting device may refer to the above embodiments.

In the embodiment of the present disclosure, FIG. 7 shows the specific distribution of reflection points in the quantum dot layer. The reflection points are hemispherical, and distributed on concentric circles in the quantum dot layer. The radius of the reflection points distributed on a same concentric circle is the same, and the radius of reflection points distributed on each of the concentric circles is decreased along with the increase in radius of each of the concentric circles, and the density of a plurality of reflection points distributed on each of the concentric circles is decreased along with the increase in radius of each of the concentric circles.

Referring to FIG. 7, taking a reflection point 701 arranged in the center of the region directly facing the light-emitting chip as an example, the radius of the reflection point 701 is r1 (not shown), and a plurality of reflection points are arranged in a second concentric circle 702 adjacent to the reflection point 701 by regarding the reflection point 701 as a center, wherein the radius of the plurality of reflection points arranged in the concentric circle 702 is r2 (not shown), and r1 is greater than r2. A plurality of reflection points are arranged in a third concentric circle 703 adjacent to the second concentric circle 702 by regarding the reflection point 701 as a center, and the radius of the plurality of reflection points arranged in the third concentric circle 703 is r3 (not shown), wherein r3 is greater than r2. Further, the density of the reflection points arranged in the concentric circle 703 is less than that of the reflection points arranged in the concentric circle 702. In the embodiments of the present disclosure, "density" refers to a ratio of the number of reflection points arranged in a same concentric circle to the circumference of the circle. According to the above rule, it may be determined that the radius of the plurality of reflection points arranged in a concentric circle 705 is r5 (not shown), the radius r5 of the reflection points arranged in the concentric circle 705 is less than the radius r4 (not shown) of the reflection points arranged in a concentric circle 704. Moreover, the radius of the concentric circle 705 is greater than that of the concentric circle 704, i.e., the density of the reflection points arranged in the concentric circle 705 is less than that of the reflection points arranged in the concentric circle 704.

According to the above analysis, it may be determined that a plurality of reflection points are arranged on the surface of the quantum dot layer opposite to the light-emitting chip, the plurality of reflection points are distributed on concentric circles in the quantum dot layer, the radius of the reflection points distributed on a same concentric circle is the same, and the radius of reflection points distributed on each of the concentric circles is decreased along with the increase in radius of each of the concentric circles, and the density of the plurality of reflection points distributed on each of the concentric circles is decreased along with the increase in radius of each of the concentric circles. It is known that the light intensity of the light-emitting chip shows Lambertian distribution, i.e. the light power in a unit area having a small angle is higher than that in a unit area having a large angle. However, in the embodiment of the present disclosure, even if there are problems that the light power in a unit area having a small angle is high and more photons pass through thereof in a unit time because the light intensity of the light-emitting chip shows Lambertian distribution, the difference in light intensity, between light received by the region of the quantum dot layer directly facing the light-emitting chip from the light-emitting chip and light received by the peripheral region of the quantum dot layer from the light-emitting chip, may be decreased effectively. Because the reflection points are arranged on the surface of the quantum dot layer opposite to the light-emitting chip, and the reflection points have a reflection effect, light received by the region of the quantum dot layer directly facing the light-emitting chip from the light-emitting chip will be reflected. Moreover, in the embodiment of the present disclosure, the reflection points arranged in the quantum dot layer have the following characteristics of distribution: (1) the radius of the reflection point in the center of the region directly facing the light-emitting chip is greater than that of any one of the reflection points arranged in other concentric circles regarding this reflection point as a center; and (2) the density of the reflection points arranged in other concentric circles, regarding the reflection point in the center of the region directly facing the light-emitting chip as a center, is decreased along with the increase in radius of each of the concentric circles. Therefore, the probability of reflecting light emitted from the light-emitting chip by the reflection points arranged in the region of the quantum dot layer directly facing the light-emitting chip is also higher than that by the reflection points arranged in the peripheral region of the quantum dot layer. After being irradiated onto the reflection points in the region directly facing the light-emitting chip, light emitted from the light-emitting chip will be reflected by the reflection points, the light path of light emitted from the light-emitting chip is changed, so that light emitted from the light-emitting chip is reflected to the pedestal, and due to the reflection effect of the pedestal, light emitted from the light-emitting chip will be reflected by the pedestal again, and light reflected again may enter the quantum dot layer from the peripheral regions of the quantum dots layer. With this method according to the embodiments of the present disclosure, the failure of the quantum dots in the quantum dot layer due to high power irradiation from the light-emitting chip may be avoided, and it is also ensured that the quantum dot layer may uniformly receive light emitted from the light-emitting chip.

In some embodiments of the present disclosure, the radius of the reflection points distributed on each of the concentric circles is decreased along with the increase in radius of each of the concentric circles. Preferably, the radius of the reflection points may be regularly and progressively decreased by a set value from the center of the region directly facing the light-emitting chip to the edge of the quantum dot layer. Further, the radius of the reflection points may also be progressively decreased by any value from the center of the region directly facing the light-emitting chip to the edge of the ht guide plate 1003, the reflector 1002 is arranged below the light guide plate 1003, and the optical diaphragm group 1004 is arranged in a light emergent side of the light rectly facing the light-emitting chip to the edge of the quantum dot layer, however, whether the radius of any two adjacent reflection points is progressively decreased or not from the center of the region directly facing the light-emitting chip to the edge of the quantum dot layer is not specifically limited, for example, the radius of a quantum dot 1 in the region directly facing the light-emitting chip is r1, the radius of a quantum dot 2 in a concentric circle 2 adjacent to the quantum dot 1 is r2, and the radius of a quantum dot 3 in a concentric circle 3 adjacent to the quantum dot 2 is also r2, but the radius of a quantum dot 5 in a concentric circle 5 is r4, wherein r1 is greater than r2, and r2 is greater than r4. In the embodiments of the present disclosure, the value, by which the radius of a plurality of quantum dots arranged on the surface opposite to the light-emitting chip from the center of the region directly facing the light-emitting chip to the edge of the quantum dot layer is progressively decreased, is not specifically limited.

In some embodiments of the present disclosure, the density of the plurality of reflection points distributed on each of the concentric circles is decreased along with the increase in radius of each of the concentric circles. Preferably, the density of the plurality of reflection points distributed on each of the concentric circles is regularly decreased by a set value along with the increase in radius of each of the concentric circles. Further, the density of the plurality of reflection points distributed on each of the concentric circles is progressively decreased by any value along with the increase in radius of each of the concentric circles. Further, the density of the plurality of reflection points distributed on each of the concentric circles is overall decreased along with the increase in radius of each of the concentric circles, but whether the radius of the reflection points distributed on any adjacent concentric circles is decreased or not is not specifically limited. In the embodiments of the present disclosure, whether the density of the plurality of reflection points distributed on each of the concentric circles is decreased or not along with the increase in radius of each of the concentric circles is not specifically limited.

Embodiment 4

Figure 8:
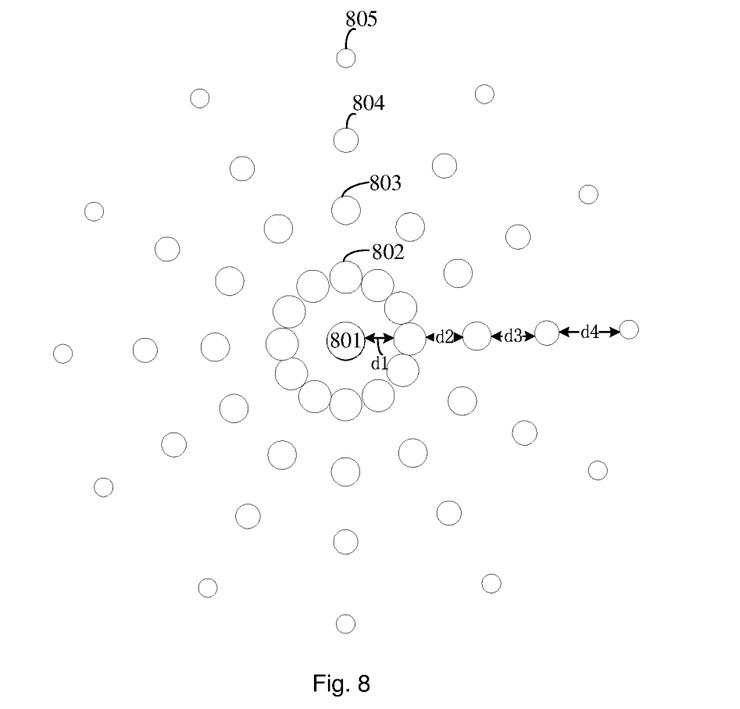
FIG. 8 is a schematic diagram of still another distribution of reflection point in the quantum dot layer according to the embodiments of the present disclosure.

A quantum dot light-emitting device, at least provided with reflection points in a region of the quantum dot layer directly facing the light-emitting chip, according to an embodiment of the present disclosure will be further illustrated as below with reference to FIG. 8. FIG. 8 schematically shows a schematic diagram of distribution of reflection points in the quantum dot layer according to the embodiment of the present disclosure.

The embodiment of the present disclosure only further defines the distribution of reflection points in the quantum dot layer. Other structures related to the quantum dot light-emitting device may refer to the above embodiments.

In the embodiment of the present disclosure, FIG. 8 shows the specific distribution of the reflection points in the quantum dot layer. The reflection points are hemispherical, and distributed on concentric circles in the quantum dot layer. The radius of the reflection points distributed on a same concentric circle is the same, and the radius of reflection points distributed on each of the concentric circles is decreased along with the increase in radius of each of the concentric circles, the density of the plurality of reflection points distributed on each of the concentric circles is decreased along with the increase in radius of each of the concentric circles, and the distance between the concentric circles is gradually increased from the center to the edge of the quantum dot layer.

Referring to FIG. 8, regarding a reflection point 801 arranged in the center of the region directly facing the light-emitting chip as an example, the radius of the reflection point 801 is r1 (not shown). A plurality of reflection points are arranged in a second concentric circle 802 adjacent to the reflection point 801 by regarding the reflection point 801 as a center, the radius of the plurality of reflection points is r2 (not shown), and r1 is greater than r2. Further, the distance between any point in the concentric circle 802 and the reflection point 801 is d1. A plurality of reflection points are arranged in a third concentric circle 803 adjacent to the second concentric circle 802 by regarding the reflection point 801 as a center, the radius of the plurality of reflection points is r3 (not shown), and r2 is greater than r3. Further, the shortest distance between any point in the concentric circle 803 and the concentric circle 802 is d2, and d2 is greater than d1. The density of the reflection points arranged in the concentric circle 803 is less than that of the reflection points arranged in the concentric circle 802. In the embodiment of the present disclosure, "density" refers to a ratio of the number of reflection points arranged in a same concentric circle to the circumference of the circle. According to the above rule, it may be determined that the radius of the plurality of reflection points arranged in a concentric circle 805 is r5 (not shown), the radius r5 of the reflection points arranged in the concentric circle 805 is less than the radius r4 of the reflection points arranged in a concentric circle 804. Further, the shortest distance between any point in the concentric circle 805 and the concentric circle 804 is d4, and d4 is greater than d3. Moreover, the density of the reflection points arranged in the concentric circle 805 is less than that of the reflection points arranged in the concentric circle 804.

According to the above analysis, it may be determined that, a plurality of reflection points are arranged on the surface of the quantum dot layer opposite to the light-emitting chip, the reflection points are distributed on concentric circles in the quantum dot layer, the radius of the reflection points distributed on a same concentric circle is the same, and the radius of reflection points distributed on each of the concentric circles is decreased along with the increase in radius of each of the concentric circles, and the density of the plurality of reflection points distributed on each of the concentric circles is decreased along with the increase in radius of each of the concentric circles, and the distance between the concentric circles is gradually increased from the center to the edge of the quantum dot layer. It is known that the light intensity of the light-emitting chip shows Lambertian distribution, i.e. the light power in a unit area having a small angle is higher than that in a unit area having a large angle. However, in the embodiment of the present disclosure, even if there are problems that the light power in a unit area having a small angle is high and more photons pass through thereof in a unit time because the light intensity of the light-emitting chip shows Lambertian distribution, the difference in light intensity, between light received by the region of the quantum dot layer directly facing the light-emitting chip from the light-emitting chip and light received by the peripheral region of the quantum dot layer from the light-emitting chip, may be decreased effectively. Because the reflection points are arranged on the surface of the quantum dot layer opposite to the light-emitting chip, and the reflection points have a reflection effect, light received by the region of the quantum dot layer directly facing the light-emitting chip from the light-emitting chip will be reflected. Moreover, in the embodiment of the present disclosure, the reflection points arranged in the quantum dot layer have the following characteristics of distribution: (1) the radius of the reflection point in the center of the region directly facing the light-emitting chip is greater than that of any one of the reflection points arranged in other concentric circles regarding this reflection point as a center; (2) the density of the reflection points arranged in other concentric circles, regarding the reflection point in the center of the region directly facing the light-emitting chip as a center, is decreased along with the increase in radius of each of the concentric circles; and (3) the distance between the concentric circles, regarding the reflection point in the center of the region directly facing the light-emitting chip as a center, is gradually increased from the center to the edge of the quantum dot layer. Therefore, the probability of reflecting light emitted from the light-emitting chip by the reflection points arranged in the region of the quantum dot layer directly facing the light-emitting chip is also higher than that by the reflection points arranged in the peripheral region of the quantum dot layer. After being irradiated onto the reflection points in the region directly facing the light-emitting chip, light emitted from the light-emitting chip will be reflected by the reflection points, the light path of light emitted from the light-emitting chip is changed, so that light emitted from the light-emitting chip is reflected to the pedestal, and due to the reflection effect of the pedestal, light emitted from the light-emitting chip will be reflected by the pedestal again, and light reflected again may enter the quantum dot layer from the peripheral regions of the quantum dots layer. With this method according to the embodiment of the present disclosure, the failure of the quantum dots in the quantum dot layer due to high power irradiation from the light-emitting chip may be avoided, and it is also ensured that the quantum dot layer may uniformly receive light emitted from the light-emitting chip.

Figure 9:
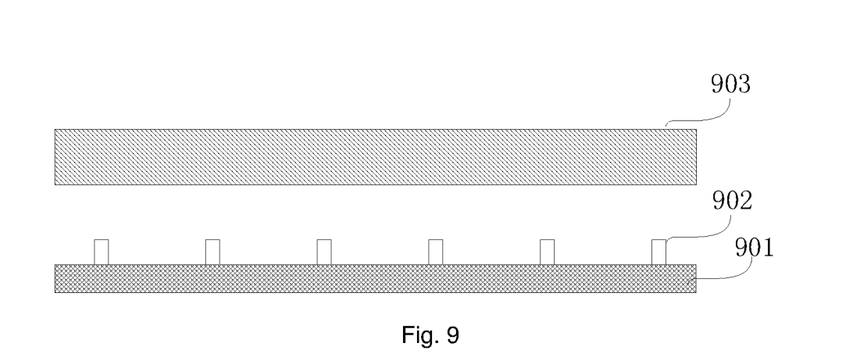
FIG. 9 is a structure diagram of a direct or bottom-type back-light module according to embodiments of the present disclosure.

FIG. 9 shows a direct or bottom-type back-light module according to one embodiment of the present disclosure, including: a back plate 901, a quantum dot light-emitting device 902 and an optical diaphragm group 903. The quantum dot light-emitting device 902 is any one of the quantum dot light-emitting devices in the embodiments of the present disclosure, the quantum dot light-emitting device 902 is arranged on the back plate 901, and the optical diaphragm group 903 is arranged in a light emergent side of the quantum dot light-emitting device 902.

Figure 10:
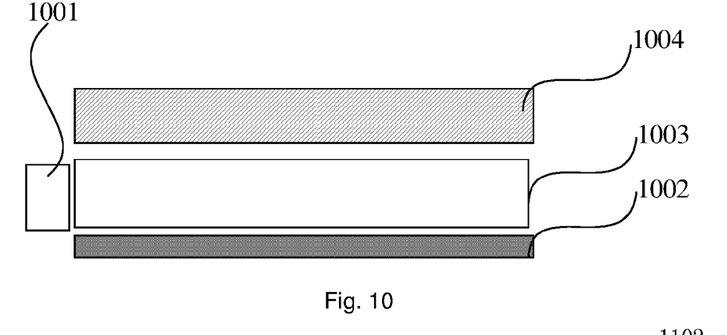
FIG. 10 is a structure diagram of an edge-type back-light module according to embodiments of the present disclosure.

FIG. 10 shows an edge-type back-light module according to one embodiment of the present disclosure, including: a quantum dot light-emitting device 1001, a reflector 1002, a light guide plate 1003 and an optical diaphragm group 1004. The quantum dot light-emitting device 1001 is any one of the quantum dot light-emitting devices in the embodiments of the present disclosure, the quantum dot light-emitting device 1001 is arranged on one side of the light guide plate 1003, the reflector 1002 is arranged below the light guide plate 1003, and the optical diaphragm group 1004 is arranged in a light emergent side of the light guide plate 1003.

Figure 11:
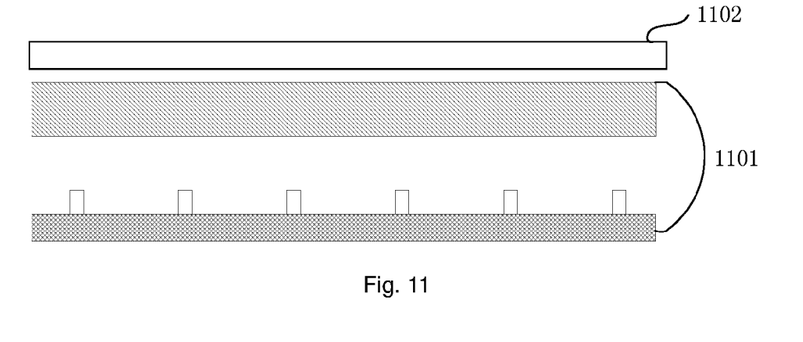
FIG. 11 is a structure diagram of a display device according to embodiments of the present disclosure.

FIG. 11 shows a display device according to one embodiment of the present disclosure, including: the direct or bottom-type back-light module 1101 according to the embodiment of the present disclosure and a display panel 1102, wherein the display panel 1102 is arranged in a light emergent side of the direct or bottom-type back-light module 1101.

Figure 12:
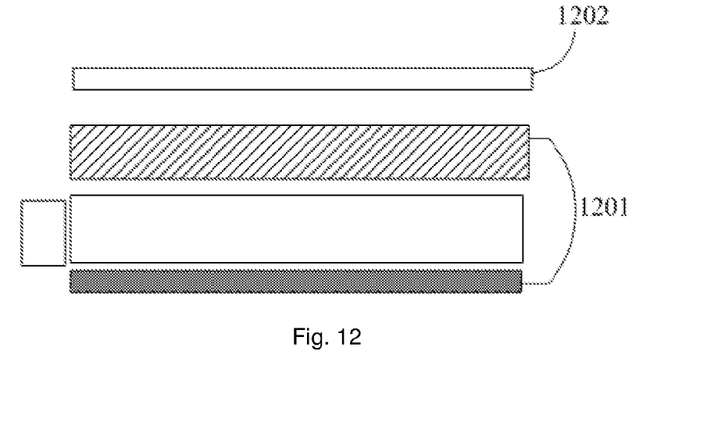
FIG. 12 is a structure diagram of another display device according to embodiments of the present disclosure.

FIG. 12 shows another display device according to one embodiment of the present disclosure, including: the edge-type back-light module 1201 according to the embodiment of the present disclosure and a display panel 1202, wherein the display panel 1202 is arranged in a light emergent side of the edge-type back-light module 1201.

In the embodiment of the present disclosure, the quantum dot layer is arranged on the pedestal, and located in a light emergent side of the light-emitting chip with a gap being arranged between the quantum dot layer and the light-emitting chip. Therefore, the quantum dot layer may receive irradiation light from the light-emitting chip. Since reflection points are arranged on a surface of the quantum dot layer opposite to the light-emitting chip, and the reflection points are at least distributed in a region of the quantum dot layer directly facing the light-emitting chip, the reflection points in the region directly facing the light-emitting chip may reflect light from a direction of the light-emitting chip right opposite to the quantum dot layer, and the light power received by the quantum dot layer in the region directly facing the light-emitting chip from the light-emitting chip is decreased, so as to avoid the failure of the quantum dot layer in the region directly facing the light-emitting chip caused by high temperature irradiation. Moreover, because the reflection points reflect light from the direction of the light-emitting chip right opposite to the quantum dot layer so that the reflected light enters the quantum dot layer from an edge portion of the quantum dot layer, the light irradiation received by the quantum dot layer in the quantum dot light-emitting device is relatively uniform. Therefore, the problem of receiving non-uniform light irradiation by the light source device is avoided.

The above descriptions are just preferred embodiments of the present disclosure and not used for limiting the present disclosure, and any modifications, equivalent replacements and improvements made within the spirit and principle of the present disclosure shall be regarded as falling into the protection scope of the present disclosure.

Although the preferred embodiments of the present application have been described, a person of ordinary skill in the art may make other variations and modifications on these embodiments once understanding the basic creative concept. Hence, it is intended to interpret the appended claims as including the preferred embodiments and all variations and modifications falling into the scope of the present application.

Apparently, a person of ordinary skill in the art may make various modifications and variations on the present application without departing from the spirit and scope of the present application. In this way, if those modifications and variations of the present application belong to the scope of the claims and equivalents thereof, the present application is intended to include those modifications and variations.

What is claimed is:

1. A quantum dot light-emitting device, comprising:
   a pedestal;
   a light-emitting chip arranged on the pedestal; and
   a quantum dot layer arranged on the pedestal, the quantum dot layer being located in a light emergent side of the light-emitting chip with a gap being arranged between the quantum dot layer and the light-emitting chip, wherein reflection points are arranged on a surface of the quantum dot layer opposite to the light-emitting chip, and the reflection points are at least distributed in a region of the quantum dot layer directly facing the light-emitting chip,
   wherein the reflection points have at least one arrangement selected from a group consisting of:
   a density of the reflection points is reduced from a center of the region directly facing the light-emitting chip to an edge of the quantum dot layer,
   the reflection points are distributed in an entire region of the quantum dot layer, and in a straight line passing through the center of the region directly facing the light-emitting chip, a distance between any two adjacent reflection points is gradually increased from the center to the edge of the quantum dot layer, and
   the reflection points are distributed in the entire region of the quantum dot layer, and sizes of the reflection points are gradually decreased from the center of the region directly facing the light-emitting chip to the edge of the quantum dot layer.

2. The quantum dot light-emitting device according to claim 1, wherein
   a groove is provided in the pedestal, with the light-emitting chip being arranged at a bottom of the groove and the quantum dot layer being arranged at an opening of the groove, wherein the pedestal is packaged with the light-emitting chip and the quantum dot layer to form an integral structure.

3. The quantum dot light-emitting device according to claim 2, wherein
   an inner wall of the groove is capable of reflecting light.

4. The quantum dot light-emitting device according to claim 1, wherein
   the reflection points are hemispherical, and distributed on concentric circles in the quantum dot layer; and
   wherein the radius of reflection points distributed on a same concentric circle is the same, and the radius of reflection points distributed on each of the concentric circles is decreased along with the increase in radius of each of the concentric circles, and the density of a plurality of reflection points distributed on each of the concentric circles is decreased along with the increase in radius of each of the concentric circles.

5. The quantum dot light-emitting device according to claim 1, wherein the quantum dot layer comprises:
   a first substrate and a second substrate arranged opposite to each other; and
   quantum dots sealed between the first substrate and the second substrate, and water-oxygen isolating material around the quantum dots.

6. A display device, comprising:
   a direct or bottom-type back-light module, comprising:
      a back plate;
      a quantum dot light-emitting device arranged on the back plate, wherein the quantum dot light-emitting device comprises:
         a pedestal;
         a light-emitting chip arranged on the pedestal; and
         a quantum dot layer arranged on the pedestal, the quantum dot layer being located in a light emergent side of the light-emitting chip with a gap being arranged between the quantum dot layer and the light-emitting chip, wherein reflection points are arranged on a surface of the quantum dot layer opposite to the light-emitting chip, the reflection points being at least distributed in a region of the quantum dot layer directly facing the light-emitting chip; and
      an optical diaphragm group arranged on a light emergent side of the quantum dot light-emitting device; and
   a display panel arranged on a light emergent side of the direct or bottom-type back-light module, wherein the reflection points have at least one arrangement selected from a group consisting of:

a density of the reflection points is reduced from a center of the region directly facing the light-emitting chip to an edge of the quantum dot layer, the reflection points are distributed in an entire region of the quantum dot layer, and in a straight line passing through the center of the region directly facing the light-emitting chip, a distance between any two adjacent reflection points is gradually increased from the center to the edge of the quantum dot layer, and the reflection points are distributed in the entire region of the quantum dot layer, and sizes of the reflection points are gradually decreased from the center of the region directly facing the light-emitting chip to the edge of the quantum dot layer.

7. The display device according to claim 6, wherein a groove is provided in the pedestal, with the light-emitting chip being arranged at a bottom of the groove and the quantum dot layer being arranged at an opening of the groove, wherein the pedestal is packaged with the light-emitting chip and the quantum dot layer to form an integral structure.

8. The display device according to claim 6, wherein the reflection points are hemispherical, and distributed on concentric circles in the quantum dot layer; and wherein the radius of the reflection points distributed on a same concentric circle is the same, and the radius of reflection points distributed on each of the concentric circles is decreased along with the increase in radius of each of the concentric circles, and the density of a plurality of reflection points distributed on each of the concentric circles is decreased along with the increase in radius of each of the concentric circles.

9. A display device, comprising:
an edge-type back-light module, comprising:
   a reflector film;
   a light guide plate, the light guide plate having a light incident surface, a light emergent surface and a reflecting surface, and the reflector film being arranged on the reflecting surface of the light guide plate; and
   a quantum dot light-emitting device arranged on the side of the light incident surface of the light guide plate, wherein the quantum dot light-emitting device comprises:
      a pedestal;
      a light-emitting chip arranged on the pedestal; and
      a quantum dot layer arranged on the pedestal, the quantum dot layer being located in a light emergent side of the light-emitting chip with a gap being arranged between the quantum dot layer and the light-emitting chip, wherein reflection points are arranged on a surface of the quantum dot layer opposite to the light-emitting chip, and the reflection points are at least distributed in a region of the quantum dot layer directly facing the light-emitting chip; and
   an optical diaphragm group arranged on the side of the light emergent surface of the light guide plate; and
a display panel arranged on a light emergent side of the edge-type back-light module,
wherein the reflection points have at least one arrangement selected from a group consisting of:

a density of the reflection points is reduced from a center of the region directly facing the light-emitting chip to an edge of the quantum dot layer, the reflection points are distributed in an entire region of the quantum dot layer, and in a straight line passing through the center of the region directly facing the light-emitting chip, a distance between any two adjacent reflection points is gradually increased from the center to the edge of the quantum dot layer, and the reflection points are distributed in the entire region of the quantum dot layer, and sizes of the reflection points are gradually decreased from the center of the region directly facing the light-emitting chip to the edge of the quantum dot layer.

10. The display device according to claim 9, wherein a groove is provided in the pedestal, with the light-emitting chip being arranged at a bottom of the groove and the quantum dot layer being arranged at an opening of the groove, wherein the pedestal is packaged with the light-emitting chip and the quantum dot layer to form an integral structure.

11. The display device according to claim 9, wherein the reflection points are hemispherical, and distributed on concentric circles in the quantum dot layer; and wherein the radius of the reflection points distributed on a same concentric circle is the same, and the radius of reflection points distributed on each of the concentric circles is decreased along with the increase in radius of each of the concentric circles, and the density of a plurality of reflection points distributed on each of the concentric circles is decreased along with the increase in radius of each of the concentric circles.

* * * * *